United States Patent
Pannese et al.

(10) Patent No.: US 9,992,155 B2
(45) Date of Patent: Jun. 5, 2018

(54) DNS ALIAS SYNCHRONIZATION IN REPLICATION TOPOLOGY

(71) Applicant: HITACHI DATA SYSTEMS CORPORATION, Santa Clara, CA (US)

(72) Inventors: Donald P. Pannese, Westford, MA (US); Benjamin Isherwood, Tewksbury, MA (US)

(73) Assignee: HITACHI VANTARA CORPORATION, Santa Clara, CA (US)

( * ) Notice: Subject to any disclaimer, the term of this patent is extended or adjusted under 35 U.S.C. 154(b) by 560 days.

(21) Appl. No.: 14/362,626

(22) PCT Filed: Feb. 27, 2013

(86) PCT No.: PCT/US2013/027872
§ 371 (c)(1),
(2) Date: Jun. 4, 2014

(87) PCT Pub. No.: WO2013/148039
PCT Pub. Date: Oct. 3, 2013

(65) Prior Publication Data
US 2015/0012666 A1    Jan. 8, 2015

Related U.S. Application Data

(63) Continuation-in-part of application No. PCT/US2012/031109, filed on Mar. 29, 2012.

(51) Int. Cl.
*G06F 15/16* (2006.01)
*H04L 29/12* (2006.01)
*H04L 29/08* (2006.01)

(52) U.S. Cl.
CPC .......... *H04L 61/1511* (2013.01); *H04L 61/15* (2013.01); *H04L 61/1552* (2013.01); *H04L 67/1036* (2013.01); *H04L 67/1095* (2013.01)

(58) Field of Classification Search
None
See application file for complete search history.

(56) References Cited

U.S. PATENT DOCUMENTS 6,836,805 B1    12/2004  Cook
6,963,914 B1 *  11/2005  Breitbart ............. H04L 67/1095
                                                        709/225

(Continued)

FOREIGN PATENT DOCUMENTS

RU    2 310 903 C2    11/2007
WO    03/107204 A1    12/2003

(Continued)

*Primary Examiner* — Aaron Strange
*Assistant Examiner* — Mohammad Yousuf A Mian
(74) *Attorney, Agent, or Firm* — Mattingly & Malur, PC

(57) ABSTRACT

A redundant array of independent nodes are networked together. Each node executes an instance of an application that provides object-based storage. The nodes are grouped into a plurality of systems each having multiple nodes. The systems have one or more replication links each being formed to indicate replication of data from one system to another system in a replicated environment where each system is configured as a sub-domain in a Domain Name System (DNS) infrastructure. A DNS alias synchronization method comprises maintaining updated information, within each system, of all replication links involving that system and of DNS aliases of other systems associated with all replication links involving that system (S602-S607). This enables that system to process network-based requests, on behalf of the other systems, without redirecting the requests from the other systems to that system.

18 Claims, 14 Drawing Sheets

(56) References Cited

U.S. PATENT DOCUMENTS

| | | |
|---|---|---|
| 7,155,466 B2 | 12/2006 | Rodriguez et al. |
| 7,162,499 B2 | 1/2007 | Lees et al. |
| 7,657,581 B2 | 2/2010 | Orenstein et al. |
| 8,117,240 B1 | 2/2012 | Shelby, III |
| 9,367,560 B1* | 6/2016 | Ely .................. G06F 17/30174 |
| 2007/0189153 A1 | 8/2007 | Mason |
| 2009/0113075 A1 | 4/2009 | Migault |
| 2011/0099146 A1* | 4/2011 | McAlister ........... G06F 11/3006 707/634 |
| 2011/0099147 A1* | 4/2011 | McAlister ......... G06F 17/30581 707/639 |
| 2011/0106757 A1* | 5/2011 | Pickney ............ G06F 17/30212 707/617 |
| 2011/0106802 A1 | 5/2011 | Pinkney et al. |

FOREIGN PATENT DOCUMENTS

| | | |
|---|---|---|
| WO | 2008/157267 A1 | 12/2008 |
| WO | 2011/091646 A1 | 8/2011 |

* cited by examiner

| EVENT | ACTION | KNOWN ALIAS LIST (KAL) | | |
|---|---|---|---|---|
| | | A | B | C |
| INITIAL STATE | | A B | A B | C |
| LINK B->C ADDED | B AND C SYNC KAL WITH EACH OTHER | A B | A B C | A B C |
| | B NOTIFIES A OF CHANGE | A B C | A B C | A B C |
| | A RESPONDS TO B WITH KNOWN ALIASES | A B C | A B C | A B C |
| | B FINDS NO CHANGES AND COMPLETES | A B C | A B C | A B C |

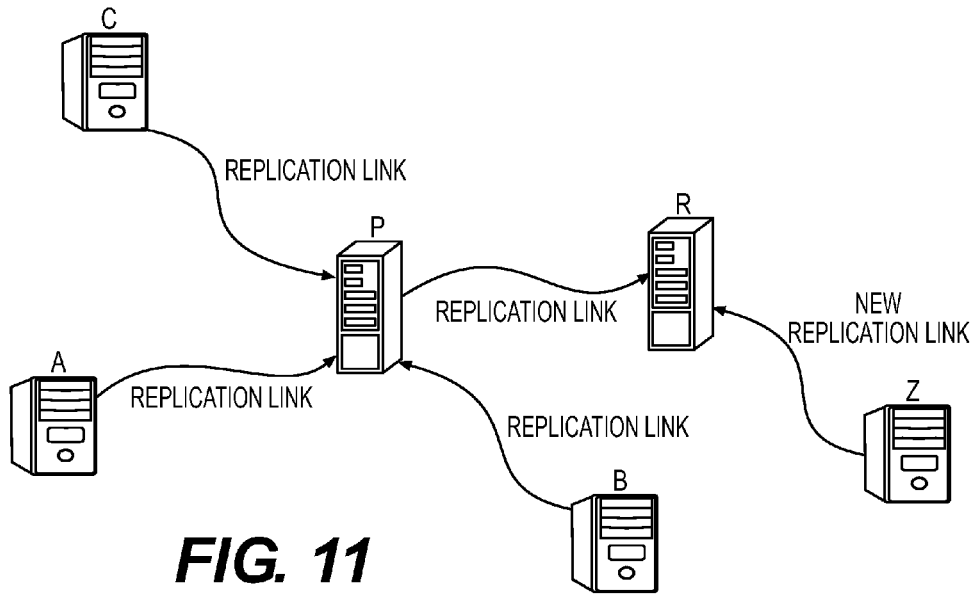

FIG. 11

| EVENT | ACTION | KNOWN ALIAS LIST (KAL) ON SYSTEMS | | | | | |
|---|---|---|---|---|---|---|---|
| | | P | R | A | B | C | Z |
| INITIAL STATE | | PRABC | PRABC | PRABC | PRABC | PRABC | Z |
| ADD LINK Z ->R | Z & R TRADE ALIASES | PRABC | PRABCZ | PRABC | PRABC | PRABC | PRABCZ |
| | R NOTIFIES P OF CHANGE | PRABCZ | PRABCZ | PRABC | PRABC | PRABC | PRABCZ |
| | P RESPONDS TO R WITH ALIASES. NO UPDATES | PRABCZ | PRABCZ | PRABC | PRABC | PRABC | PRABCZ |
| | P NOTIFIES A,B,C OF CHANGE | PRABCZ | PRABCZ | PRABCZ | PRABCZ | PRABCZ | PRABCZ |
| | A,B,C RESPONDS TO P. P FINDS NO CHANGES AND STOPS | PRABCZ | PRABCZ | PRABCZ | PRABCZ | PRABCZ | PRABCZ |

FIG. 12

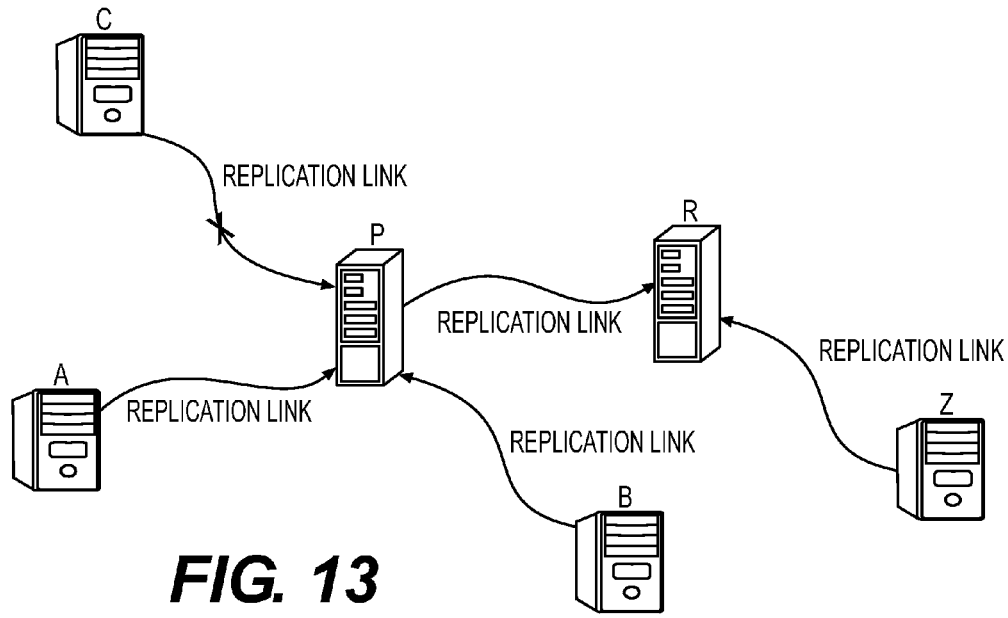

FIG. 13

| EVENT | ACTION | KNOWN ALIAS LIST (KAL) ON SYSTEMS | | | | | |
|---|---|---|---|---|---|---|---|
| | | P | R | A | B | C | Z |
| INITIAL STATE | | PRABCZ | PRABCZ | PRABCZ | PRABCZ | PRABCZ | PRABCZ |
| DELETE LINK C->P | C & P UPDATE KAL | PRABZ DEL-CP | PRABCZ | PRABCZ | PRABCZ | C | PRABCZ |
| | P TRIGGERS KAL-SYNC ON A,B AND R | PRABZ DEL-CP | PRABCZ | PRABCZ | PRABCZ | C | PRABCZ |
| | A,B, AND R PROCESS AND RESPONDS TO P | PRABZ | PRABZ DEL-CP | PRABZ | PRABZ | C | PRABCZ |
| | R TRIGGERS KAL-SYNC ON Z | PRABZ | PRABZ DEL-CP | PRABZ | PRABZ | C | PRABCZ |
| | Z RESPONDS TO R | PRABZ | PRABZ | PRABZ | PRABZ | C | PRABZ |

FIG. 14

| EVENT | ACTION | KNOWN ALIAS LIST (KAL) | | |
|---|---|---|---|---|
| | | A | B | C |
| INITIAL STATE | | A#B | A#B | C |
| LINK B->C ADDED | B AND C SYNC KAL WITH EACH OTHER | A#B | A#B, B#C | A#B, B#C |
| | B NOTIFIES A OF CHANGE | A#B, B#C | A#B, B#C | A#B, B#C |
| | A REPSONDS TO B WITH KNOWN ALIASES | A#B, B#C | A#B, B#C | A#B, B#C |
| | B FINDS NO CHANGES AND COMPLETES | A#B, B#C | A#B, B#C | A#B, B#C |

DNS ALIAS SYNCHRONIZATION IN REPLICATION TOPOLOGY

This application claims priority from International Application No. PCT/US2012/031109, filed on Mar. 29, 2012, which is incorporated herein by reference in its entirety.

BACKGROUND OF THE INVENTION

The present invention relates generally to storage systems and, more particularly, to system and method for DNS (Domain Name System) alias synchronization in replication topology.

In a replicated environment of replicated object storage system or content platform, in the event where an object is not available on the primary system, the client application has traditionally had to do the work of redirecting to the replica to access the object. As a result, the client application has the burden of managing additional work. The following are some of the reasons an object is not available on the primary system: (1) the object in the content platform Storage Manager is corrupted; (2) the content platform Storage Manager on which the object exists is down; and (3) the node on which the object exists fails (which in turn caused the Storage Manager on which object existed to go down). For example, if a failover scenario were to occur in a replication topology, the customer has to manually intervene to redirect the client applications from the system that has failed to the system which is the target of the failover.

BRIEF SUMMARY OF THE INVENTION

Exemplary embodiments of the invention provide a replicated object storage system or content platform (ecosystem) with DNS alias synchronization. In an ecosystem that consists of two or more systems in a replicated environment where each system is configured as a sub-domain in the Domain Names System (DNS) infrastructure, it is necessary for every participating system to know what the DNS aliases of the other participating systems are in a manner that does not require every participating system to communicate directly with all other systems in the ecosystem. The knowledge of all the DNS aliases in the ecosystem is required to enable any system in the ecosystem to be able to process network-based requests on behalf of another participating system and limiting requests to only those systems in the ecosystem. In this way, individual systems are made aware of all other participating systems in the replication topology. As a result, requests will be serviced without the need for a customer to manually redirect the client applications.

One solution is to implement an "eventually consistent" method of DNS alias synchronization in replication environments having simple to complex topologies derived from the core chain and many-to-one topologies. When a system joins/leaves the environment by establishing/removing a replication link or a participating system has a DNS alias update, it will notify all directly linked systems (i.e., peers) of its own DNS alias. The peer handling of the notification will include: (1) merging the notifying system's alias with its own known aliases and identifying any possible differences, (2) responding back to the notifying system with all its known valid aliases, and (3) if the peer actually made any change(s) to its known aliases, notifying all its other peers of the change(s) by that peer. Eventually, any change(s) will be propagated throughout the environment to all systems and the systems will no longer have any change(s) to report.

An aspect of the present invention is related to a redundant array of independent nodes, the nodes being grouped into a plurality of systems each having multiple nodes. The plurality of systems have one or more replication links each being formed to indicate replication of data from one system to another system in a replicated environment where each system is configured as a sub-domain in a Domain Name System (DNS) infrastructure. Each system has a DNS name that is also a DNS alias of said each system to other systems. A DNS alias synchronization method comprises maintaining updated information, within each system of the plurality of systems, of all replication links involving said each system and of DNS aliases of other systems associated with said all replication links involving said each system. The updated information of all replication links involving a system and of DNS aliases of other systems associated with all replication links involving the system enables the system to process network-based requests, on behalf of the other systems associated with all replication links involving the system, without redirecting the requests from the other systems to the system.

In some embodiments, the method further comprises providing the updated information, from each system, to a DNS server which enables said each system to process network-based requests, on behalf of the other systems associated with all replication links involving said each system, without redirecting the requests from the other systems to said each system. Maintaining updated information comprises updating a known alias list within said each system, the known alias list including mapping of the replication links between the DNS names of the systems associated with all replication links involving said each system, and any replication links that have recently been deleted from said all replication links involving said each system. For a system to initiate updating the known alias list as an initiating system, the updating comprises: sending a synchronization request to all systems that are each connected to the initiating system by a direct replication link, the synchronization request including a local known alias list of the initiating system and the DNS alias of the initiating system; receiving a response from each system that received the synchronization request from the initiating system; generating a merged known alias list for the initiating system from all the responses received by the initiating system; and storing the merged known alias list generated for the initiating system as the local known alias list of the initiating system.

In specific embodiments, for a system that receives, as a receiving system, a synchronization request from another system with a known alias list of said another system, the updating comprises: merging the known alias list from the synchronization request with a local known alias list of the receiving system to produce a merged known alias list for the receiving system; storing the merged known alias list for the receiving system as the local known alias list of the receiving system; and returning a response to said another system that sent the synchronization request, the response including the merged known alias list for the receiving system. If the local known alias list of the receiving system has changed based on the synchronization request from said another system, the updating further comprises: propagating the synchronization request to all systems that are each connected to the receiving system by a direct replication link excluding said another system, the synchronization request including the local known alias list of the receiving system and the DNS alias of the receiving system; receiving a response from each system that received the propagated synchronization request from the receiving system; generating a new merged known alias list for the receiving system from all the responses received by the receiving system; and storing the new merged known alias list as the local known alias list of the receiving system. If the new merged known alias list is different from the local known alias list of the receiving system prior to generating the merged known alias list for the receiving system, the updating further comprises: sending a second synchronization request, with the receiving system as a new initiating system, to all systems that are each connected to the new initiating system by a direct replication link, the second synchronization request including the local known alias list of the new initiating system and the DNS alias of the new initiating system; receiving a response from each system that received the second synchronization request from the new initiating system; generating a merged known alias list for the new initiating system from all the responses received by the new initiating system; and storing the merged known alias list for the new initiating system as the local known alias list of the new initiating system.

Another aspect of the invention is directed to an apparatus for Domain Name System (DNS) alias synchronization in a redundant array of independent nodes, the nodes being grouped into a plurality of systems each having multiple nodes. The plurality of systems have one or more replication links each being formed to indicate replication of data from one system to another system in a replicated environment where each system is configured as a sub-domain in a DNS infrastructure. Each system has a DNS name that is also a DNS alias of said each system to other systems. The apparatus comprises a processor, a memory, and a DNS alias synchronization module provided for each system. The DNS alias synchronization module is configured to maintain updated information, within the system in which the DNS alias synchronization module is provided, of all replication links involving the system and of DNS aliases of other systems associated with said all replication links involving the system. The updated information of all replication links involving a system and of DNS aliases of other systems associated with all replication links involving the system enables the system to process network-based requests, on behalf of the other systems associated with all replication links involving the system, without redirecting the requests from the other systems to the system.

In some embodiments, the DNS alias synchronization module is configured to provide the updated information, from the system in which the DNS alias synchronization module is provided, to a DNS server which enables the system to process network-based requests, on behalf of the other systems associated with all replication links involving the system, without redirecting the requests from the other systems to the system.

Another aspect of this invention is directed to a computer-readable storage medium storing a plurality of instructions for controlling a data processor to perform Domain Name System (DNS) alias synchronization, in a redundant array of independent nodes, the nodes being grouped into a plurality of systems each having multiple nodes. The plurality of systems have one or more replication links each being formed to indicate replication of data from one system to another system in a replicated environment where each system is configured as a sub-domain in a DNS infrastructure. Each system has a DNS name that is also a DNS alias of said each system to other systems. The computer-readable storage medium is provided in each system. The plurality of instructions comprise instructions that cause the data processor to maintain updated information, within the system in which the computer-readable storage medium is provided, of all replication links involving the system and of DNS aliases of other systems associated with said all replication links involving the system. The updated information of all replication links involving a system and of DNS aliases of other systems associated with all replication links involving the system enables the system to process network-based requests, on behalf of the other systems associated with all replication links involving the system, without redirecting the requests from the other systems to the system.

These and other features and advantages of the present invention will become apparent to those of ordinary skill in the art in view of the following detailed description of the specific embodiments.

BRIEF DESCRIPTION OF THE DRAWINGS

FIG. 11 shows an example of system addition in a many-to-one replicated system with disaster recovery.

FIG. 12 is a table illustrating a process of DNS alias synchronization for the system addition of FIG. 11.

FIG. 13 shows an example of system deletion in a many-to-one replicated system with disaster recovery.

FIG. 14 is a table illustrating a process of DNS alias synchronization for the system deletion of FIG. 13.

DETAILED DESCRIPTION OF THE INVENTION

Figure 1:
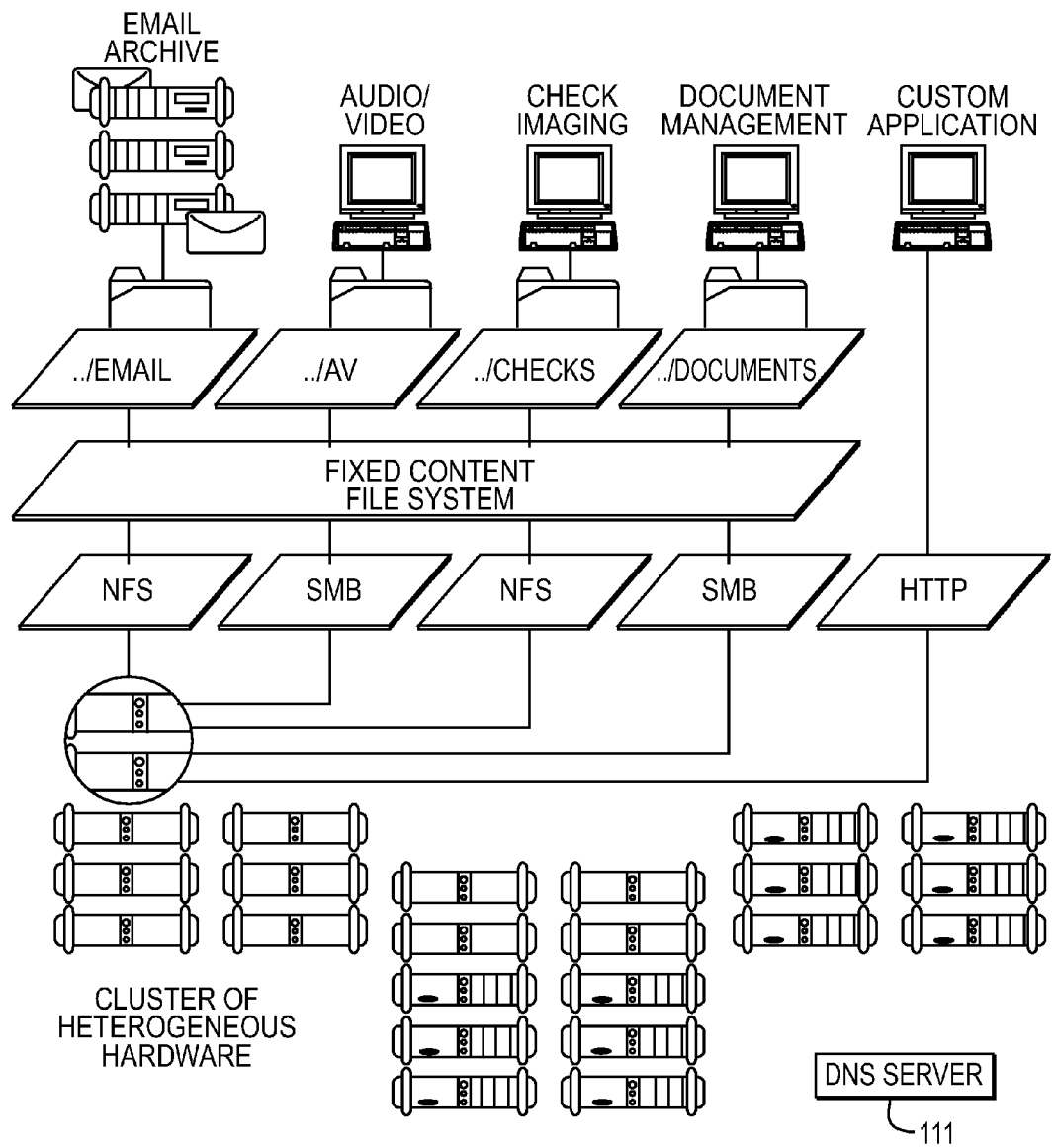
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for transparent recovery of damaged or unavailable objects in a replicated object storage system.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
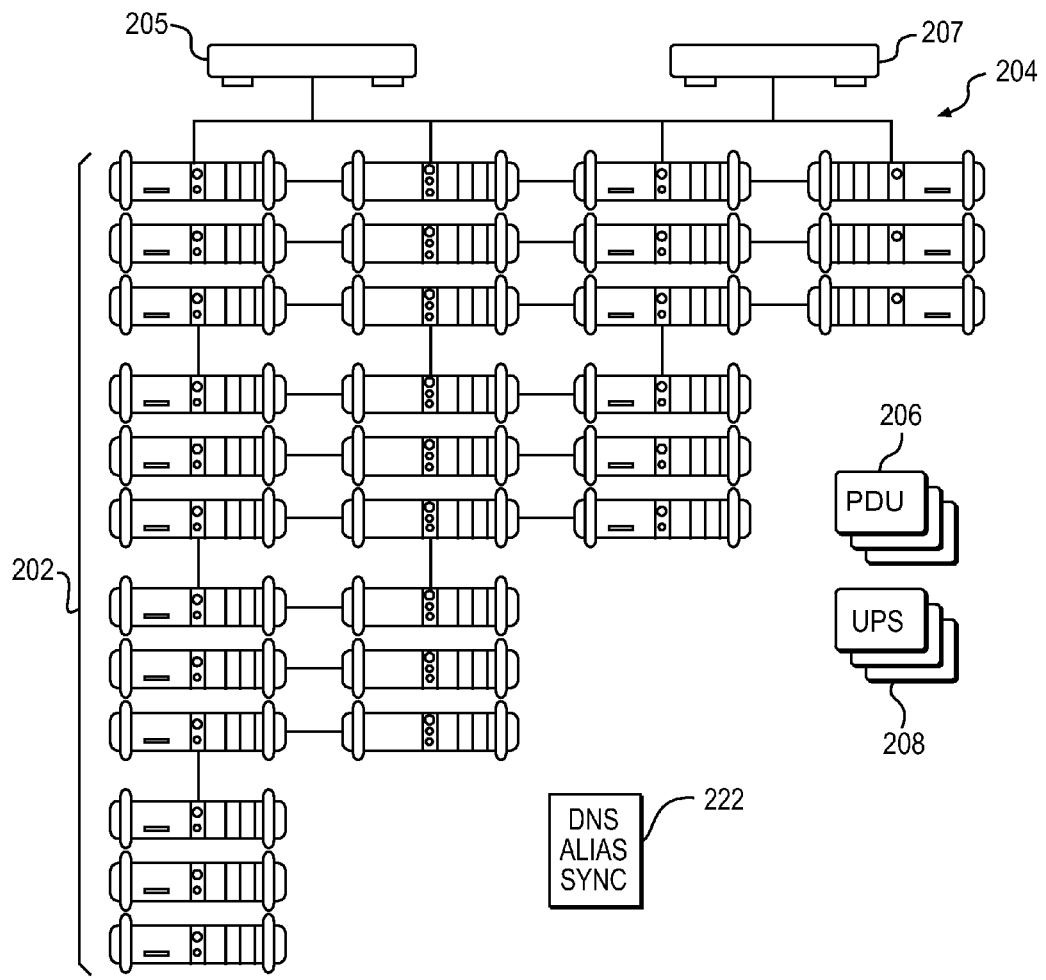
FIG. 2 is a simplified representation of a redundant array of independent nodes each of which is symmetric and supports an archive cluster application.

As described in commonly owned U.S. Pat. No. 7,155, 466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2 U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate DNS name server. Thus, for example, the clusters domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
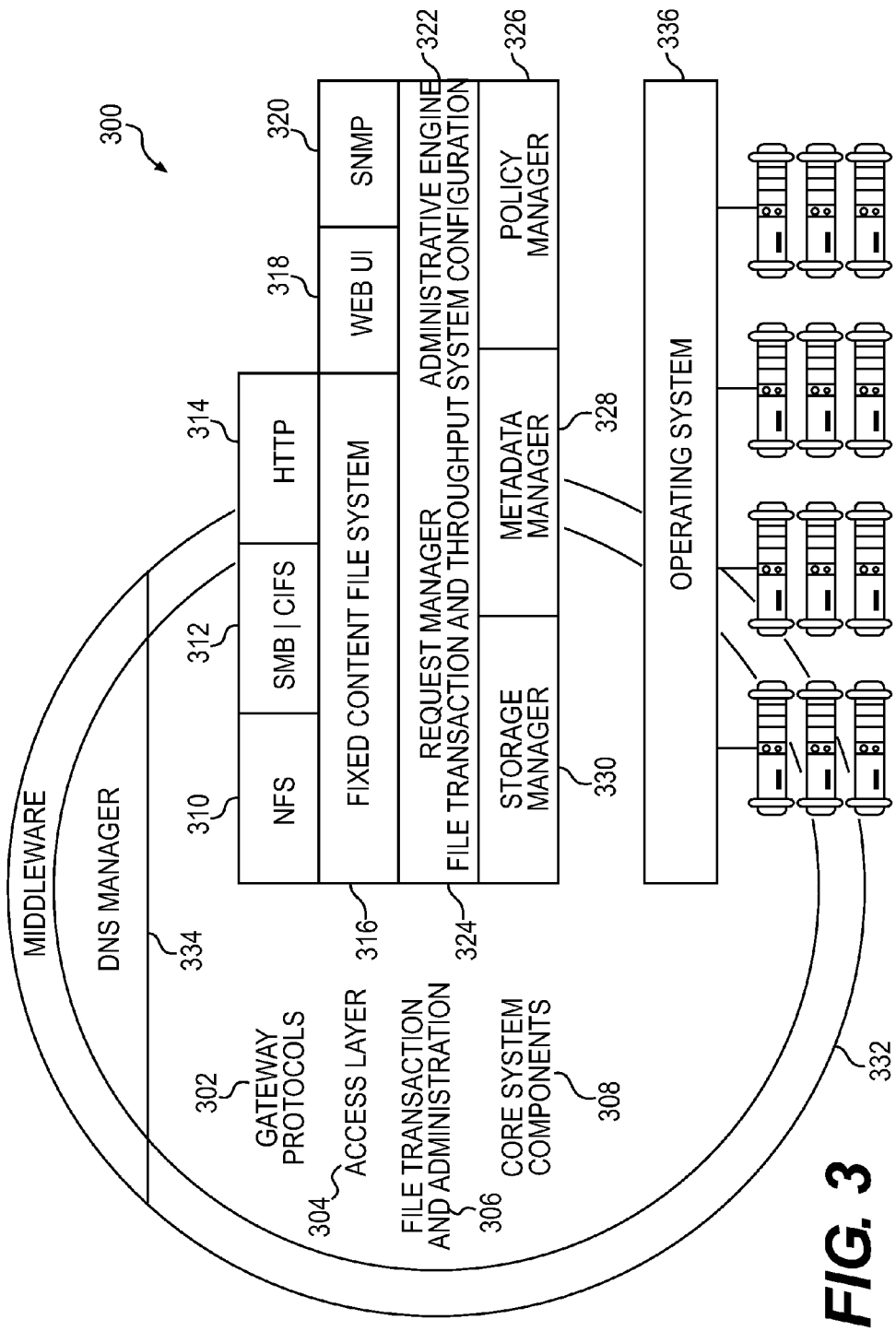
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application such as the HCP (Hitachi Content Platform) application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication No. 2007/0189153 and U.S. Pat. No. 7,657,581, which are incorporated herein by reference.

As used herein, a namespace is a logical partition of the cluster, and essentially serves as a collection of objects particular to at least one defined application. Each namespace has a private filesystem with respect to other namespaces. Moreover, access to one namespace does not grant a user access to another namespace. A cluster/system of nodes is a physical archive instance. A tenant is a grouping of namespace(s) and possibly other subtenants. A cluster/system is a physical archive instance. See commonly assigned U.S. Patent Application Publication No. 2011/0106802, which is incorporated herein by reference in its entirety.

II. Domain Name Service, DNS Alias, and Replicating Link

In computer networking, systems are contacted by host domain name specification that uniquely identifies a system that resides in a domain. This organization is known as Domain Name System (DNS). This is a well known standard for identifying and locating systems on a network. The details of DNS are described in many Request For Comments (RFCs) readily documented on the internet including, for example, RFC1034 and RFC 1035. The host domain name is also known as the DNS alias.

Within these specifications are the concepts of sub-zones and DNS Zone Files. A sub-zone is a grouping of names that share the same domain name. An example domain is starting network name of the company; for instance, hds.com is the top level domain name for Hitachi Data Systems. These domains may have many child sub-zones or individual systems that need to be identified. To resolve the resources within a domain, a server is deployed that will act as a DNS Server and will utilize a DNS Zone file that identifies all the resources with the domain. The domain and the DNS Server IP address is registered with a higher level DNS Server to advertise itself and the domain it services.

A content platform contains a DNS Server 111 (FIG. 1) and is assigned a domain name. This domain name is registered as a sub-zone of a higher level domain within the company deploying the system. For example, for a content platform system named "hcp1" that is deployed, at the top level is the "hds.com" domain with the sub-zone name of "hcp1.hds.com." The content platform DNS Server 111 is responsible for resolving addresses for the resources that the content platform provides. These resources are virtual content platform systems organized as tenants and namespaces. An example DNS name for one such resource would be "ns1.ten1.hcp1.hds.com." These resources are configured in a DNS Zone File on each node of a content platform system for which the DNS Server 111 uses to resolve the names. A DNS name for a resource is also referred to as a DNS alias. A content platform system will have many DNS aliases to access the various resources on the system.

Replication is the function of making multiple copies of data on multiple systems typically in geographically separated locations for the purpose of providing disaster recovery of data in the event of a catastrophic loss of one system. The simplest topology for a replication is one-to-one replication where a first system is replicating content to a second system. More complex topologies can consist of a many-to-one as well as a combination of multiple basic topologies. Within these topologies, data may be copied in only one direction or both directions.

Figure 4:
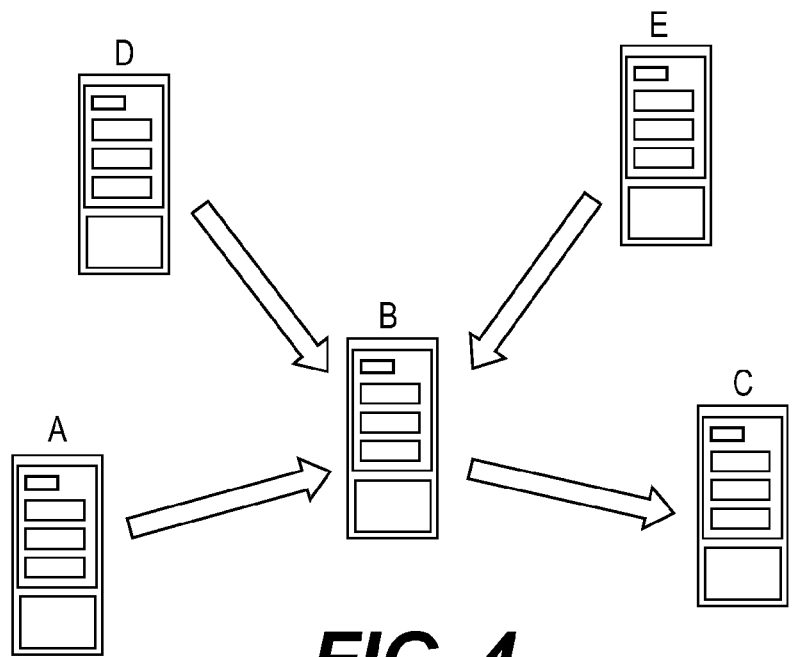
FIG. 4 shows an example of many-to-one replication with disaster recovery.

A content platform can be configured into a complex configuration consisting of a Many-to-One inward replication along with one-to-one outward replication. FIG. 4 shows an example of many-to-one replication with disaster recovery. This topology is useful for consolidating content from edge systems (A, D, E) into a main data center system (B), and then further protecting the main data center system with a geographically deployed disaster recovery system (C).

Each content platform system in this configuration is a self-sufficient system hosting a DNS Server for the sub-zone for which it is configured. In FIG. 4, there are replication links represented by the arrows between the content platform systems. These arrows indicate the data flow between the systems; for example, the arrow between system A and system B indicates that system A is configured with an outbound replication link and will send data to system B which has an inbound link configuration. While system A and system B have knowledge about each other, system A has no knowledge about system C, system D, or system E.

III. DNS Alias Synchronization

According to exemplary embodiments, the replicated object storage system or content platform performs DNS alias synchronization in order to maintain the knowledge, within each individual system of the replicated system or content platform, of all replication links and DNS aliases of systems in the replicated system or content platform.

In the replicated system or content platform configuration, each individual system is self-contained and has the responsibility of servicing data requests addressed specifically to it, as identified by the DNS alias provided in the request. A system may have data initially created and alternatively addressed from another system in the ecosystem. If a request addressed to a first system in the ecosystem is received by a second system that is also hosting the data, the second system should service the request on behalf of the first system. However, any request received by any system must be validated to ensure the system specified in the request is actually part of the overall ecosystem.

As seen in FIG. 4, data written to system A will be replicated to system B and further replicated to system C. In the event that system A is unavailable, requests originally addressed to system A should be able to be satisfied by either system B or system C. While system B knows about system A through the replication link configuration (A→B), system C does not know about system A. Therefore, any requests for content addressed to system A will be rejected if requested by system C.

This invention overcomes the problem by maintaining the knowledge of all replication links and DNS aliases of systems in the ecosystem within each individual system. In each system, this knowledge is called the Known Alias List (KAL). Each system is responsible for notifying all its replication-link-connected systems of its KAL. These KAL notifications are periodic or are triggered either by changes to its own replication link configuration or by receiving KAL notification from a system replication peer. With this method, the KAL on all systems will eventually become synchronized and notifications of changes will then discontinue. This method provides both periodic synchronization insurance and DNS alias synchronization for explicit addition/removal of system from the ecosystem.

III.A. Overall Process

Figure 5:
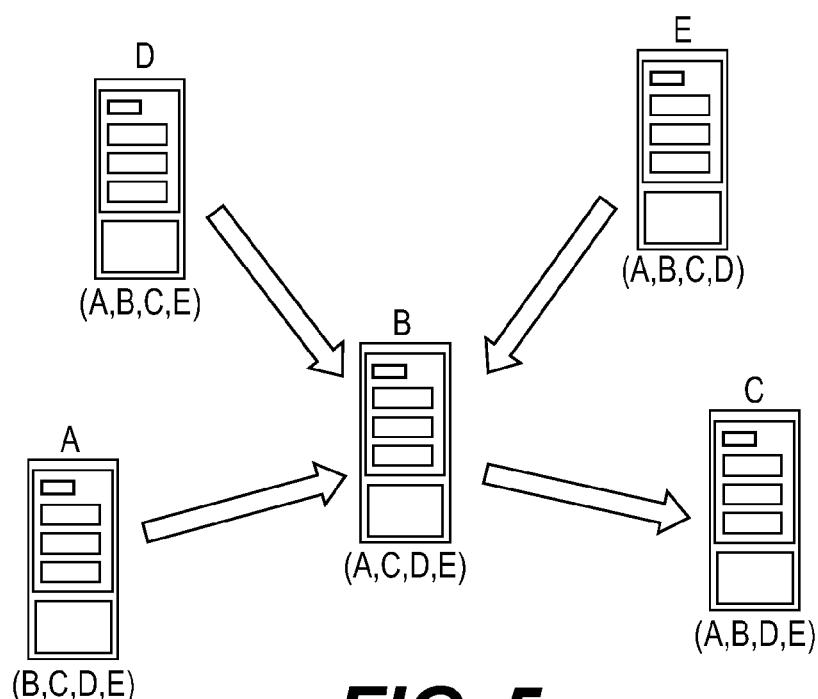
FIG. 5 shows the steady state of the replicated system of FIG. 4 after achieving "eventually consistent" DNS alias synchronization.

FIG. 5 shows the steady state of the replicated system of FIG. 4 after achieving "eventually consistent" DNS alias synchronization. In such steady state, each system has knowledge of all other systems in the KAL. Below each system in the diagram of FIG. 5 is a simplified representation of the KAL showing what other systems are in the replicated system.

The KAL contains an alias list of all system(s) currently configured in the replicated system and a list of what replication links have recently been deleted. The KALs throughout the replicated system will be updated when one of the following triggers initiates a KAL synchronization (KAL-sync): (1) create/restore/deletion of a replication link, (2) update of replication link system name configuration, (3) change of the DNS name of a system, and (4) timer expiration for periodic DNS alias synchronization (e.g., every 2 hours). This processing method produces an "eventually consistent" synchronization. All systems in the replicated system may not immediately have their KAL synchronized, but after multiple updates all systems will eventually be updated for any given change. All KAL-sync operations apply between only 2 clusters/systems (although they may trigger other KAL-sync operations between other system pairs). This approach is more scalable, and does not require that all systems in the replicated system be aware of each other. The result is that each cluster in a replication topology will contain a list of all other DNS aliases for systems in the replication topology (e.g., stored in memory), without ever directly communicating with them. This allows any given cluster in a replication topology to service requests which have been redirected from any other cluster.

This processing method provides a number of benefits. There is only ever one alias per cluster in the topology. Updates automatically remove any previous (now stale) aliases. Alias discovery/replacement continues to remove any clusters that are no longer relevant. Each cluster only communicates with those directly connected to it. The DNS server 111 preferably updates automatically the DNS alias information based on periodic inputs from the clusters.

III.B. DNS Alias Synchronization Workflow

Figure 6:
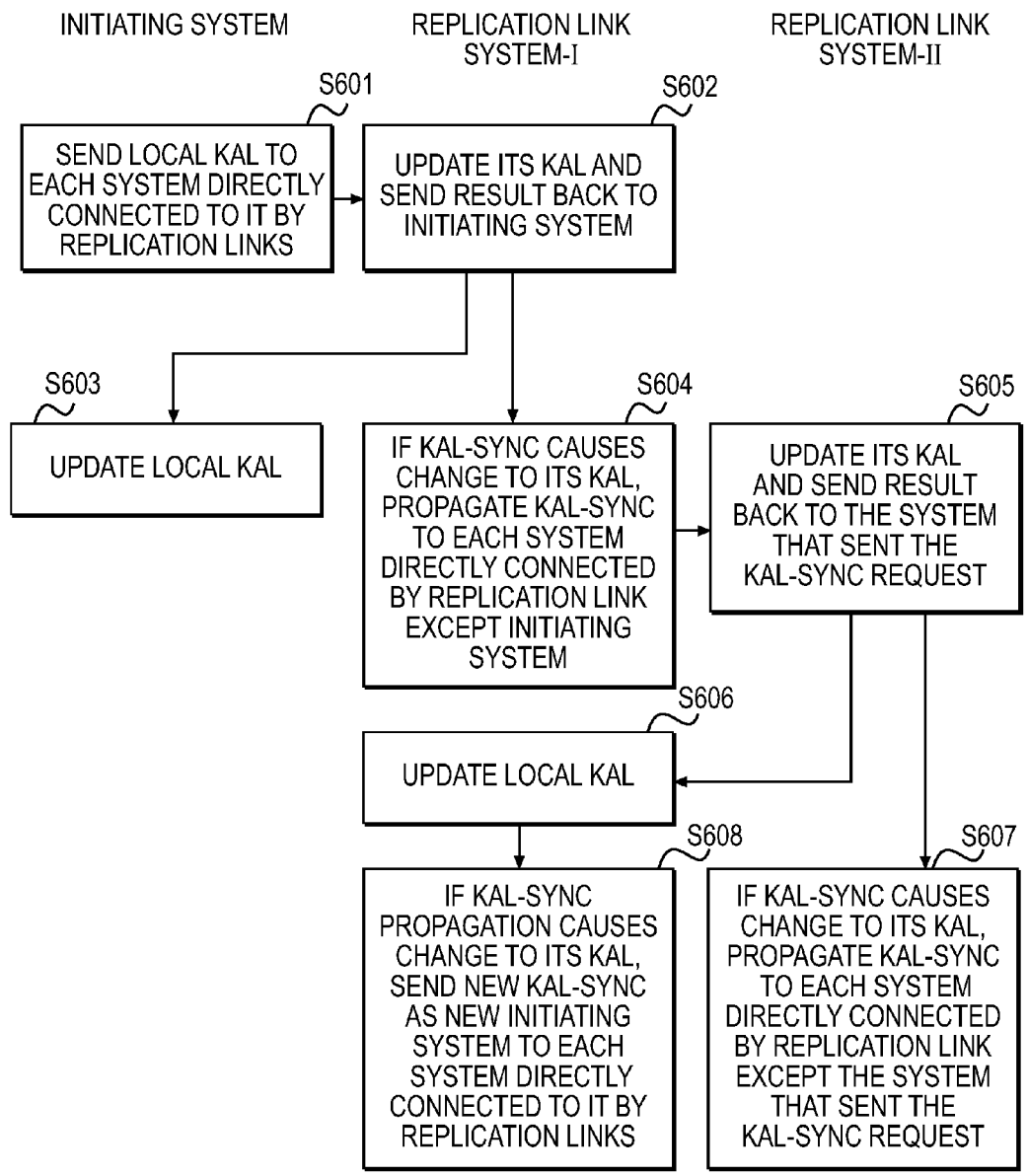
FIG. 6 shows an example of DNS alias synchronization workflow in a replicated system.

FIG. 6 shows an example of DNS alias synchronization workflow in a replicated system. Upon synchronization trigger, the triggered system initiates a replicated system wide KAL-sync as the initiating system. The initiating system does so by sending its local KAL to each system directly connected to it by replication links (S601). Each remote system (set I) that receives the sent KAL will update its own KAL and immediately send the result back to the initiating system (S602). The initiating system merges all remote system KALs which it receives in response, and sets it as the local KAL (S603).

A remote system, upon receiving a KAL-sync request and if changes are made to its local KAL, will continue to propagate the KAL-sync by initiating a KAL-sync with all other remote systems over replication links other than the one that initiated the KAL-sync (S604). The next set (set II) of replication linked systems performs steps S605 and S607 similar to S602 and S604. In S606, the current system updates its local KAL if necessary in response to S605. If this KAL-sync propagation causes changes to its local KAL, it will then trigger a new KAL-sync with the current system as a new initiating system (S608). Note that the KAL-sync for the current system will stop if no changes are made to its local KAL based on either the initial KAL-sync request in S602 or the response(s) from the remote system(s) as a result of propagating the KAL-sync in S606.

The following describes the KAL update processing. In specific embodiments, a KAL has two lists. The first is a mapping of replication link identifiers and domain names of systems known to be active in the replicated system (e.g., A→B, D→B, E→B, and B→C in FIG. 5). The second list has recently deleted replication link identifier(s). This feature is described further in connection with FIG. 13 below. In the context of any individual system within the replicated system environment, there are two activities that can cause the system to update its local KAL. The first is initiating a KAL-sync request. The second is receiving a KAL-sync request from a peer system.

Figure 7:
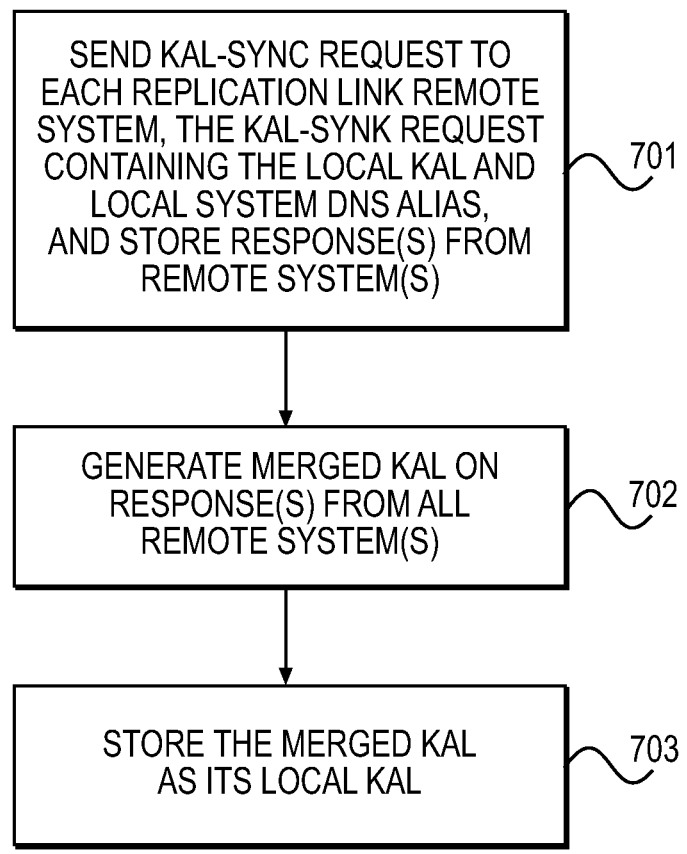
FIG. 7 is an example of a flow diagram illustrating DNS alias synchronization for an initiating system.

FIG. 7 is an example of a flow diagram illustrating DNS alias synchronization for an initiating system. When a system is triggered to initiate a KAL-sync request, it will perform the following steps. For all replication links connected locally/directly, the system will send a KAL-sync request to each replication link remote system, the KAL-sync request containing both the local KAL and the local system DNS alias, and will store the response from the remote system (S701). See S601 and S603. The system will generate a merged KAL based on the response(s) from all remote system(s) (S702). See S603. The system will store the merged KAL as its local KAL (S703). See S603. This will remove any systems that were in the prior local KAL that were not rediscovered by the remote systems responses. The deleted replication links list will be cleared.

Figure 8:
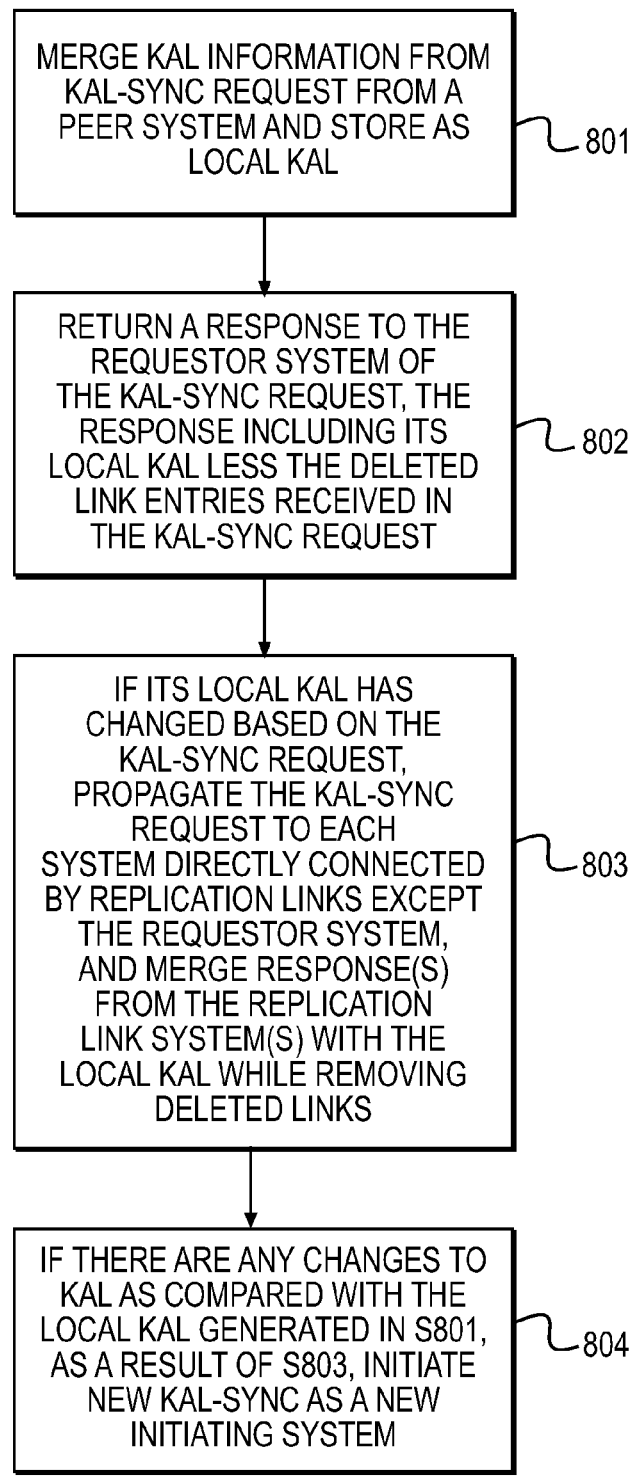
FIG. 8 is an example of a flow diagram illustrating DNS alias synchronization for a system that receives a synchronization request from a peer system.

FIG. 8 is an example of a flow diagram illustrating DNS alias synchronization for a system that receives a synchronization request from a peer system. When a system receives a KAL-sync request from a peer, it will perform the following steps. The system will merge the KAL information from the request with its local KAL and persist it within the system (S801). See S602. The merge includes processing any deleted replication link entries. The merged KAL is stored as the local KAL. The system will immediately return a response to the KAL-sync request to the requestor and the response will include its local KAL less the deleted link entries received in the KAL-sync request (S802). See S602. For all other replication links connected (excluding the link from which the initial request was received), if its local KAL has changed based on the initial request, the system will propagate the KAL-sync request to each system directly connected by replication link except the requestor system, and merge response(s) from the replication link system(s) with the local KAL while removing any deleted links (S803). See S604 and S606. Otherwise, the KAL-sync ends for the current system. Following S803, if there are any changes to the KAL as compared with the local KAL generated in S801, as a result of S803, it will trigger an event to initiate a new, full, local KAL-sync for the current system as a new initiating system according to FIG. 7 (S804). See S608. Otherwise, the KAL-sync ends for the current system.

Each system/cluster has a DNS alias synchronization module 222 (FIG. 2) that is configured to perform DNS alias synchronization including, for instance, the steps in FIGS. 6-8. The module 222 may be implemented in any suitable manner to maintain updated information of all replication links involving the system on which the module 222 resides and of DNS aliases of other systems associated with all replication links involving the system. In specific embodiments, the module 222 performs KAL-sync and maintains KAL-sync tables such as those shown in FIGS. 10, 12, and 14 below.

III.C. System Addition in Replication Link Chain

Figures 9, 10:
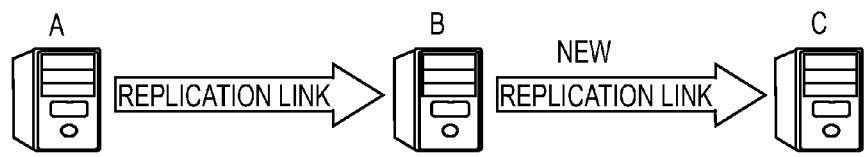
FIG. 9 shows an example of system addition in a replication link chain.
FIG. 10 is a table illustrating a process of DNS alias synchronization for the system addition of FIG. 9.

FIG. 9 shows an example of system addition in a replication link chain. The existing replicated system has systems A and B coupled by replication link A→B. A new system C is added to the replicated system with a replication link B→C. This triggers a KAL-sync on system B since a new link is created there.

FIG. 10 is a table illustrating a process of DNS alias synchronization for the system addition of FIG. 9. The table shows the process flow to update all the KALs in the replicated system. The changes to the values in the table are marked in underlined. The initial state of the KAL shows an alias list of AB for systems A and B and C for system C. After adding the replication link B→C, there is a KAL-sync between systems B and C to produce ABC for both systems B and C. Next, system B notifies system A of the change to produce ABC for system A. System A responds to the notification from system B with known aliases. This produces no changes to the KAL. System B finds no changes and the synchronization process ends.

FIG. 11 shows an example of system addition in a many-to-one replicated system with disaster recovery. The existing replicated system has systems A, B, C, P, and R with replication links A→P, B→P, C→P, and P→R. This example shows an initial replication topology with a Many-to-One configuration (A,B,C→P) with a disaster recovery system R. A new system Z is added to the replicated system with a replication link Z→R. This triggers a KAL-sync on system R since a new link is created there.

FIG. 12 is a table illustrating a process of DNS alias synchronization for the system addition of FIG. 11. The table shows the process flow to update all the KALs in the replicated system. It shows the transitions to the KALs on each system as the systems process the replicated-system-wide KAL-sync. The changes to the values in the table are marked in underlined. The initial state of the KAL shows an alias list of PRABC for systems A, B, C, P, and R and Z for system Z. After adding the replication link Z→R, there is a KAL-sync between systems R and Z by trading aliases to produce PRABCZ for both systems R and Z. Next, system R notifies system P of the change to produce PRABCZ for system P. System P responds to the notification from system R with known aliases. This produces no changes to the KAL. System P then notifies systems A, B, and C of the change to produce PRABCZ for systems A, B, and C. Systems A, B, and C each respond to the notification from system P. System P finds no changes and the synchronization process ends.

III.D. System Deletion in Replication Link Chain

FIG. 13 shows an example of system deletion in a many-to-one replicated system with disaster recovery. The existing replicated system has systems A, B, C, P, R, and Z with replication links A→P, B→P, C→P, P→R, and Z→R. The replication link C→P is deleted. This can result from the deletion of system C or unavailability of system C for various reasons, or the like. This triggers a KAL-sync on system P since a link is deleted there.

This introduces the concept of providing the KALs with replication link delete information to aid in cleaning up systems from the individual KALs (recently deleted replication link identifier(s)). The life cycles of the delete entries are short lived and are used to avoid the situation where a system DNS alias is re-introduced into a KAL in error because a system in the replicated system still thinks the alias is valid and reports it to other systems as being valid, thus introducing it to the KAL of other systems in error. This erroneous reintroduction can occur because the process of performing KAL-sync operations is asynchronous. When a system receives a KAL-sync with a replication delete (i.e., deleted replication link), it will use the information to filter all future incoming and outgoing KALs. Once any given system has received notification that all other systems directly connected via local replication links are free of the deleted replication link, the local record of replication link deletion can be cleared.

FIG. 14 is a table illustrating a process of DNS alias synchronization for the system deletion of FIG. 13. The table shows the process flow to remove system C from the replication topology and to propagate that change to the other systems by updating all the KALs in the replicated system. It shows the transitions to the KALs on each system as the systems process the replicated-system-wide KAL-sync. The changes to the values in the table are marked in underlined. The initial state of the KAL shows an alias list of PRABCZ for all systems A, B, C, P, R, and Z. After deleting the replication link C→P, there is a KAL-sync between systems C and P to produce an alias list of PRABZ with Del-CP (indicating recently deleted link C→P) for system P and C for system C. Next, system P triggers a KAL-sync on systems A, B, and R. Systems A, B, and R process the KAL-sync request and responds to system P to produce an alias list of PRABZ for systems A, B, and R, and Del-CP for system R. Next, system R triggers a KAL-sync on system Z. System Z responds to system R with an updated alias of PRABZ. This produces no changes to the KAL. System R finds no changes and the synchronization process ends.

III.E. Multi-Outbound Replication

The above describes a solution for "eventually consistent" synchronization within a replication topology of the DNS names without every system having a direct connection to all systems in the topology ecosystem. It identifies a relationship between any two systems with a link ID and the DNS name of the "remote" system. This methodology is effective in replication topologies that only allow one outbound link from each system since it eliminates the ability to create multiple inbound paths to one system from any other system in the ecosystem. Thus, it results in the elimination of one machine in the ecosystem receiving notifications from multiple peers about a single link but each peer reporting different "remote" systems for that link.

In a replication environment that allows multiple outbound links from each system, it is possible to construct replication topologies that include multiple inbound links into a system for which there are multiple paths from one system to another. This introduces the possibility of any one machine's having multiple directly connected peers reporting on a specific link, but each peer reporting a different "remote" system for that link. Because of the dual paths, the "single outbound link" methodology would cause thrashing where a given link would be identified as having two different "remote" system DNS names. Attempts to resolve the link with different remote systems would cause thrashing between the two different DNS names and never become "eventually consistent."

Figure 15:
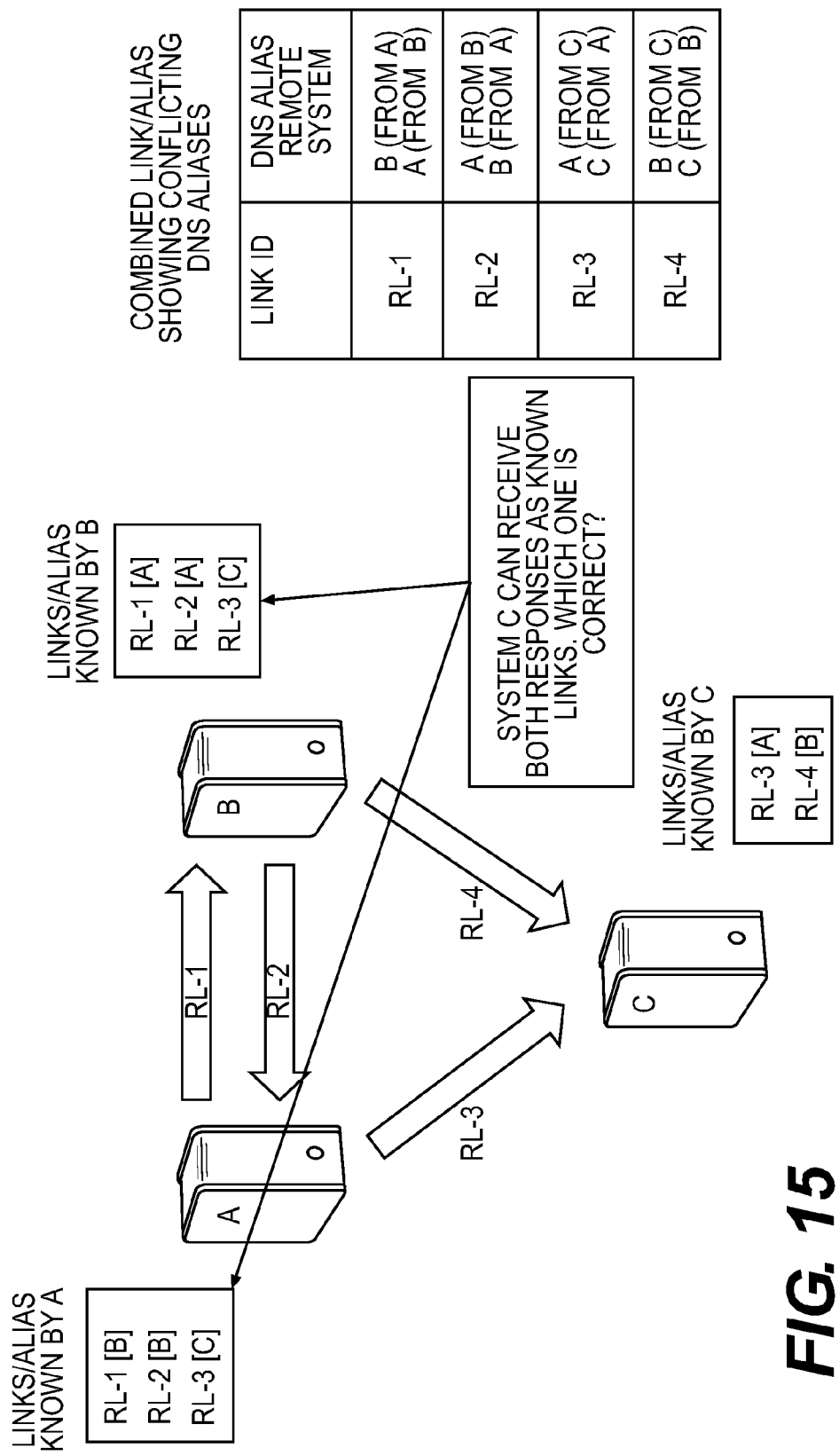
FIG. 15 shows an example of thrashing by using a single outbound link methodology for a replication environment that allows multiple outbound links.

FIG. 15 shows an example of thrashing by using a single outbound link methodology for a replication environment that allows multiple outbound links. FIG. 15 shows three systems (A, B, C) and four replication links: RL-1 from A to B, RL-2 from B to A, RL-3 from A to C, and RL-4 from B to C. Under the "single outbound link" approach, the links and alias known by A are RL-1 [B], RL-2 [B], and RL-3 [C], the links and alias known by B are RL-1 [A], RL-2 [A], and RL-4 [C], and the links and alias known by C are RL-3 [A] and RL-4 [B]. The combined link/alias show conflicting DNS aliases: link ID RL-1 having DNS alias remote system B (from A) and A (from B), link ID RL-2 having DNS alias remote system A (from B) and B (from A), link ID RL-3 having DNS alias remote system A (from C) and C (from A), and link ID RL-4 having DNS alias remote system B (from C) and C (from B). For example, system C can receive both responses as known links (RL-3 and RL-4). Under the "single outbound link" approach, one cannot decide which is correct.

The solution is to extend the "single outbound link" methodology where DNS alias information associated with each link has the DNS name of both the master and slave systems for any given link. Using the same peer DNS aliasing synchronization processing methodology described above, this new link and DNS alias name identification will fully describe each link in the topology without ambiguity.

Figure 16:
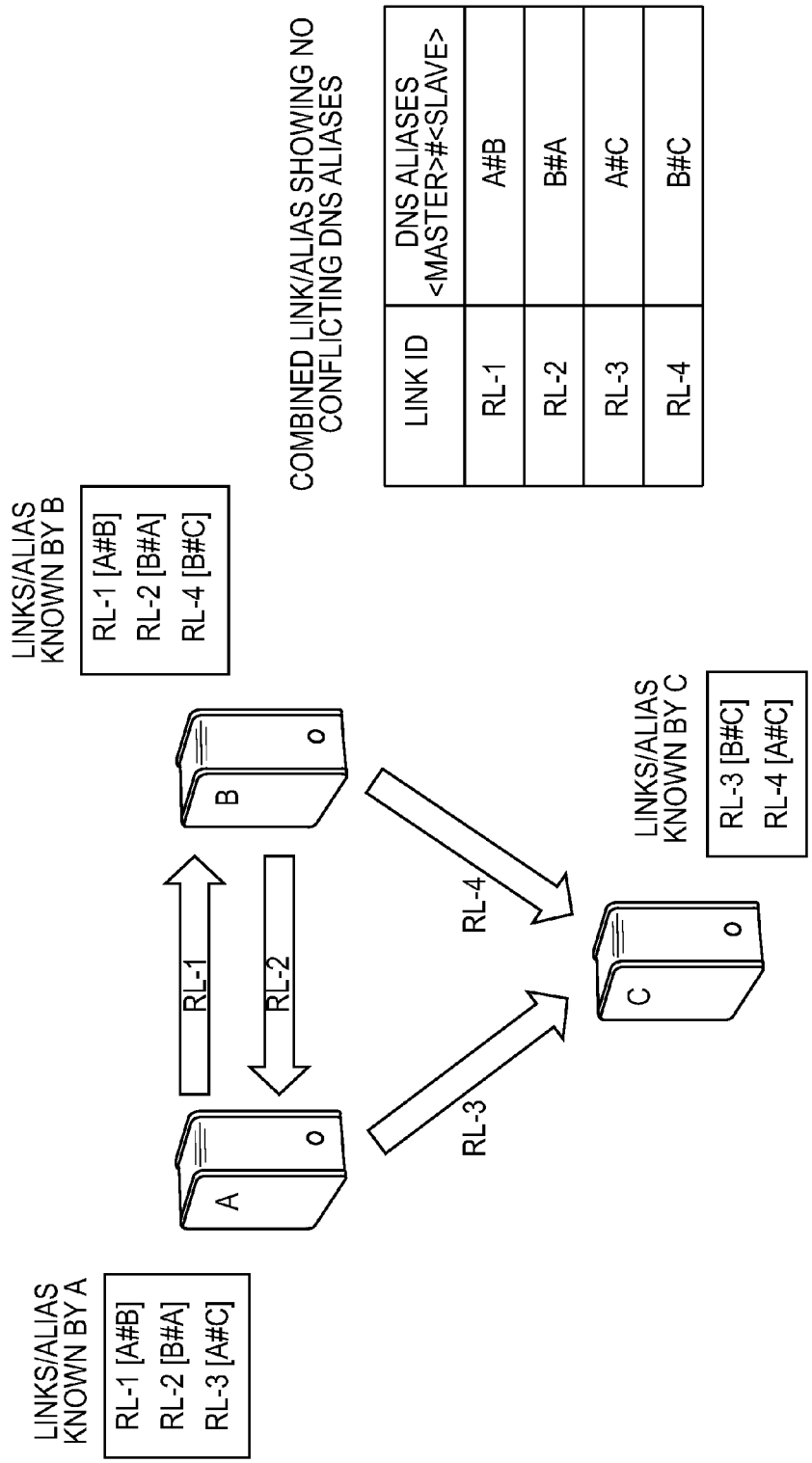
FIG. 16 shows an example of a new link and DNS alias name identification to avoid thrashing for a replication environment that allows multiple outbound links.

FIG. 16 shows an example of a new link and DNS alias name identification to avoid thrashing for a replication environment that allows multiple outbound links. The systems and replication links in FIG. 16 are the same as those in FIG. 15. The new link and DNS alias name identification uses DNS aliases having the format <Master>#<Slave> to identify the master (preceding #) and the slave (following #). The combined link/alias show no conflicting DNS aliases: link ID RL-1 having DNS alias A#B (from A to B), link ID RL-2 having DNS alias B#A (from B to A), link ID RL-3 having DNS alias A#C (from A to C), and link ID RL-4 having DNS alias B#C (from B to C).

Figures 17, 18:
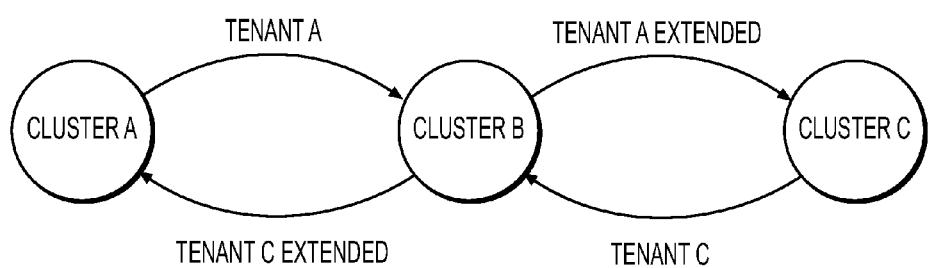
FIG. 17 shows the use of the <Master>#<Slave> format for the table of FIG. 10 illustrating a process of DNS alias synchronization for the system addition of FIG. 9.
FIG. 18 shows an example of a bi-directional chain, having a chain topology in which the A and B clusters and the B and C clusters are both connected via bi-directional links.

FIG. 17 shows the use of the <Master>#<Slave> format for the table of FIG. 10 illustrating a process of DNS alias synchronization for the system addition of FIG. 9. In the known alias list (KAL), instead of AB, the table of FIG. 17 shows A#B, and instead of ABC, the table shows A#B, B#C.

In addition to the uses outlined and described above, the new link and DNS alias name identification using the <Master>#<Slave> format will lend itself to the implementation of more advanced replication topologies. This will allow for the topologies described below while maintaining full replication topology for failover/failback as well as deeper knowledge about the potential for individual content throughout the replication topology. Some additional topologies that can be implemented include, but are not limited to, the following topologies: bi-directional chain, spray (one-to-many), and bi-directional chain with offsite DR (disaster recovery).

FIG. 18 shows an example of a bi-directional chain, having a chain topology in which the A and B clusters and the B and C clusters are both connected via bi-directional links. The chain from A to C includes link Tenant A from A to B and link Tenant A Extended from B to C. The chain from C to A includes link Tenant C from C to B and link Tenant C Extended from B to A. This configuration allows content generated on all individual clusters/systems in a chain to efficiently propagate out to every other cluster/ system.

Figure 19:
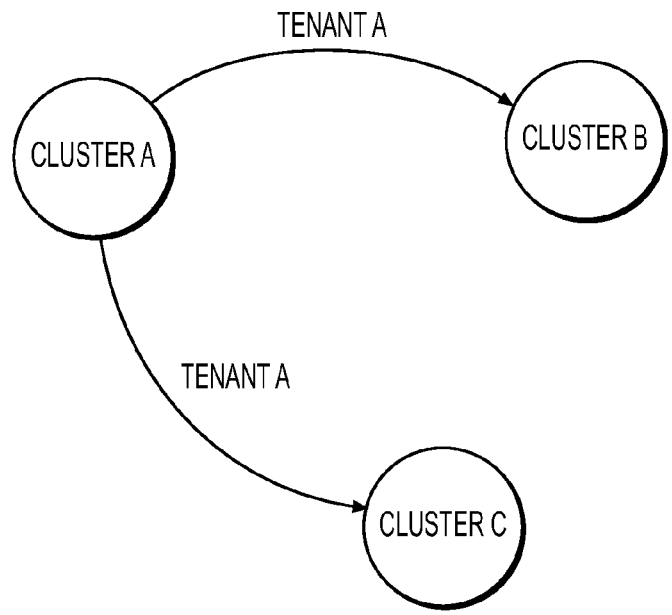
FIG. 19 shows an example of a spray (one-to-many) topology having spray data directly from a single cluster to two separate clusters.

FIG. 19 shows an example of a spray (one-to-many) topology having spray data directly from a single cluster to two separate clusters. The spray topology includes link Tenant A from A to B and link Tenant A from A to C. Each link may send the same data, different data, or a combination of the two (as each outbound link may have its own configuration). It should be noted that a chain topology is much more efficient and should always be strongly considered over this topology to meet the use case. The two heads of the chain could provide local "fast failover" capabilities in a much more efficient way than a spray topology.

Figure 20:
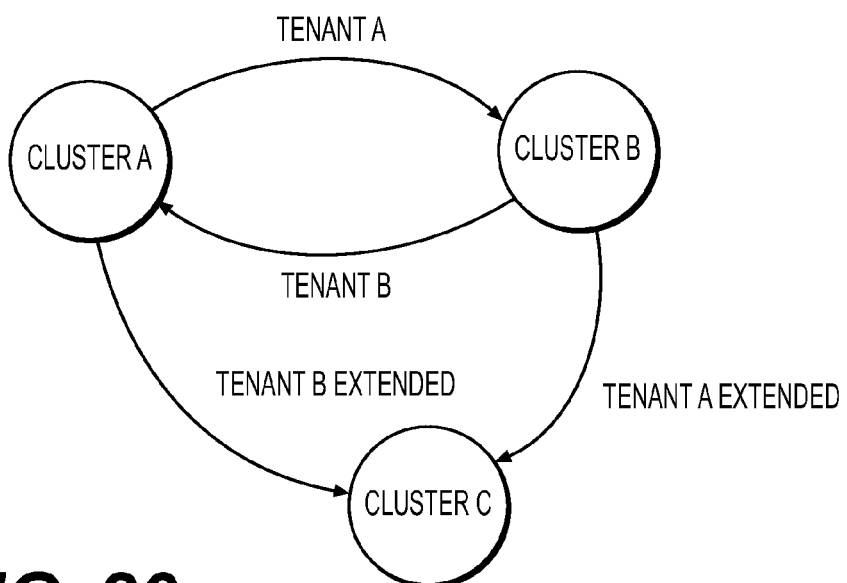
FIG. 20 shows an example of a bi-directional chain with offsite disaster recovery (DR).

FIG. 20 shows an example of a bi-directional chain with offsite disaster recovery (DR). Clusters A and B (replicated to each other with bi-directional links, namely, link Tenant A from A to B and link Tenant B from B to A) both replicate independently to DR cluster C (link Tenant A Extended from B to C and link Tenant B Extended from A to C). The chain from A to C includes link Tenant A from A to B and link Tenant A Extended from B to C. The chain from B to C includes link Tenant B from B to A and link Tenant B Extended from A to C.

With all systems in the replication topology having knowledge about all the replication links and DNS aliases for all other systems in the topology, this will lay the groundwork for more advanced operations within replication topologies. Some potential uses would be for the core of implementing an active-active replication topology and/ or providing the ability to publish/discover the topology to features that allow geographically dispersed systems to act as one system, thus allowing localization of data transfer to and from the replicated system. In addition, this information about the overall topology will help in making decisions with objects to create more intelligence with the life cycle of objects. For instance, an object could be tagged with metadata to reside in a geographical location as its final resting place within the replicated system without having to be ingested into a system in that geographical location.

Of course, the system configuration illustrated in FIG. 1 is purely exemplary of content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for DNS alias synchronization in a replicated object storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

CITATION LIST

Patent Literature

[PTL 1]
U.S. Pat. No. 7,155,466
[PTL 2]
U.S. Patent Publication No. 2007/0189153
[PTL 3]
U.S. Pat. No. 7,657,581
[PTL 4]
U.S. Patent Publication No. 2011/0106802

What is claimed is:

1. In a redundant array of independent nodes, the nodes being grouped into a plurality of systems each having multiple nodes, the plurality of systems having one or more replication links each being formed to indicate replication of data from one system to another system in a replicated environment where each system is configured as a sub-domain in a Domain Name System (DNS) infrastructure, each system having a DNS name that is also a DNS alias of said each system to other systems, a DNS alias synchronization method comprising:
    updating a known alias list within said each system, the known alias list including mapping of the replication links between the DNS names of the systems associated with all replication links involving said each system, and any replication links that have recently been deleted from said all replication links involving said each system, wherein the known alias list within each system is updated whenever a replication link is created, restored or deleted, wherein a first known alias list within a first system is updated whenever a first replication link related to the first system is created, restored or deleted and a second known alias list within a second system is updated whenever the first replication link is also related to a second replication link related to the second system and the updating of known alias lists is repeated for each other system which has a replication link that is related to the first replication link;
    maintaining the updated known alias list, within said each system of the plurality of systems, of all replication links involving said each system and of DNS aliases of other systems associated with said all replication links involving said each system;
    wherein the updated known alias list of all replication links involving said each system and of DNS aliases of other systems associated with all replication links involving said each system enables said each system to process network-based requests, on behalf of the other systems associated with all replication links involving said each system, without redirecting the requests from the other systems to said each system.

2. The method according to claim 1, further comprising:
    providing the updated known alias list, from said each system, to a DNS server which enables said each system to process network-based requests, on behalf of the other systems associated with all replication links involving said each system, without redirecting the requests from the other systems to said each system.

3. The method according to claim 1, wherein for a system to initiate updating the known alias list as an initiating system, the updating comprises:
    sending a synchronization request to all systems that are each connected to the initiating system by a direct replication link, the synchronization request including a local known alias list of the initiating system and the DNS alias of the initiating system;
    receiving a response from each system that received the synchronization request from the initiating system;
    generating a merged known alias list for the initiating system from all the responses received by the initiating system; and
    storing the merged known alias list generated for the initiating system as the local known alias list of the initiating system.

4. The method according to claim 1, wherein for a system that receives, as a receiving system, a synchronization request from another system with a known alias list of said another system, the updating comprises:
    merging the known alias list from the synchronization request with a local known alias list of the receiving system to produce a merged known alias list for the receiving system;
    storing the merged known alias list for the receiving system as the local known alias list of the receiving system; and
    returning a response to said another system that sent the synchronization request, the response including the merged known alias list for the receiving system.

5. The method according to claim 4, wherein if the local known alias list of the receiving system has changed based on the synchronization request from said another system, the updating further comprises:
    propagating the synchronization request to all systems that are each connected to the receiving system by a direct replication link excluding said another system, the synchronization request including the local known alias list of the receiving system and the DNS alias of the receiving system;
    receiving a response from each system that received the propagated synchronization request from the receiving system;
    generating a new merged known alias list for the receiving system from all the responses received by the receiving system; and
    storing the new merged known alias list as the local known alias list of the receiving system.

6. The method according to claim 5, wherein if the new merged known alias list is different from the local known alias list of the receiving system prior to generating the merged known alias list for the receiving system, the updating further comprises:
    sending a second synchronization request, with the receiving system as a new initiating system, to all systems that are each connected to the new initiating system by a direct replication link, the second synchronization request including the local known alias list of the new initiating system and the DNS alias of the new initiating system;
    receiving a response from each system that received the second synchronization request from the new initiating system;
    generating a merged known alias list for the new initiating system from all the responses received by the new initiating system; and storing the merged known alias list for the new initiating system as the local known alias list of the new initiating system.

7. An apparatus for Domain Name System (DNS) alias synchronization in a redundant array of independent nodes, the nodes being grouped into a plurality of systems each having multiple nodes, the plurality of systems having one or more replication links each being formed to indicate replication of data from one system to another system in a replicated environment where each system is configured as a sub-domain in a DNS infrastructure, each system having a DNS name that is also a DNS alias of said each system to other systems, the apparatus comprising a processor, a memory, and a DNS alias synchronization module provided for each system, the DNS alias synchronization module being configured to:
  update a known alias list within said each system, the known alias list including mapping of the replication links between the DNS names of the systems associated with all replication links involving said each system, and any replication links that have recently been deleted from said all replication links involving said each system, wherein the known alias list within each system is updated whenever a replication link is created, restored or deleted, wherein a first known alias list within a first system is updated whenever a first replication link related to the first system is created, restored or deleted and a second known alias list within a second system is updated whenever the first replication link is also related to a second replication link related to the second system and the updating of known alias lists is repeated for each other system which has a replication link that is related to the first replication link;
  maintain the updated known alias list, within said each system, of all replication links involving said each system and of DNS aliases of other systems associated with said all replication links involving said each system;
  wherein the updated known alias list of all replication links involving said each system and of DNS aliases of other systems associated with all replication links involving said each system enables said each system to process network-based requests, on behalf of the other systems associated with all replication links involving said each system, without redirecting the requests from the other systems to said each system.

8. The apparatus according to claim 7, wherein the DNS alias synchronization module is configured to:
  provide the updated known alias list, from said each system in which the DNS alias synchronization module is provided, to a DNS server which enables said each system to process network-based requests, on behalf of the other systems associated with all replication links involving said each system, without redirecting the requests from the other systems to said each system.

9. The apparatus according to claim 7, wherein for a system to initiate updating the known alias list as an initiating system, the updating to be performed by the DNS alias synchronization module on the initiating system comprises:
  sending a synchronization request to all systems that are each connected to the initiating system by a direct replication link, the synchronization request including a local known alias list of the initiating system and the DNS alias of the initiating system;
  receiving a response from each system that received the synchronization request from the initiating system;
  generating a merged known alias list for the initiating system from all the responses received by the initiating system; and
  storing the merged known alias list generated for the initiating system as the local known alias list of the initiating system.

10. The apparatus according to claim 7, wherein for a system that receives, as a receiving system, a synchronization request from another system with a known alias list of said another system, the updating to be performed by the DNS alias synchronization module on the receiving system comprises:
  merging the known alias list from the synchronization request with a local known alias list of the receiving system to produce a merged known alias list for the receiving system;
  storing the merged known alias list for the receiving system as the local known alias list of the receiving system; and
  returning a response to said another system that sent the synchronization request, the response including the merged known alias list for the receiving system.

11. The apparatus according to claim 10, wherein if the local known alias list of the receiving system has changed based on the synchronization request from said another system, the updating to be performed by the DNS alias synchronization module on the receiving system further comprises:
  propagating the synchronization request to all systems that are each connected to the receiving system by a direct replication link excluding said another system, the synchronization request including the local known alias list of the receiving system and the DNS alias of the receiving system;
  receiving a response from each system that received the propagated synchronization request from the receiving system;
  generating a new merged known alias list for the receiving system from all the responses received by the receiving system; and
  storing the new merged known alias list as the local known alias list of the receiving system.

12. The apparatus according to claim 11, wherein if the new merged known alias list is different from the local known alias list of the receiving system prior to generating the merged known alias list for the receiving system, the updating to be performed by the DNS alias synchronization module on the receiving system further comprises:
  sending a second synchronization request, with the receiving system as a new initiating system, to all systems that are each connected to the new initiating system by a direct replication link, the second synchronization request including the local known alias list of the new initiating system and the DNS alias of the new initiating system;
  receiving a response from each system that received the second synchronization request from the new initiating system;
  generating a merged known alias list for the new initiating system from all the responses received by the new initiating system; and
  storing the merged known alias list for the new initiating system as the local known alias list of the new initiating system.

13. A non-transitory computer-readable storage medium storing a plurality of instructions for controlling a data processor to perform Domain Name System (DNS) alias synchronization, in a redundant array of independent nodes, the nodes being grouped into a plurality of systems each having multiple nodes, the plurality of systems having one or more replication links each being formed to indicate replication of data from one system to another system in a replicated environment where each system is configured as a sub-domain in a DNS infrastructure, each system having a DNS name that is also a DNS alias of said each system to other systems, wherein the computer-readable storage medium is provided in each system, the plurality of instructions comprising:

instructions that cause the data processor to update a known alias list within said each system, the known alias list including mapping of the replication links between the DNS names of the systems associated with all replication links involving said each system, and any replication links that have recently been deleted from said all replication links involving said each system, wherein the known alias list within each system is updated whenever a replication link is created, restored or deleted, wherein a first known alias list within a first system is updated whenever a first replication link related to the first system is created, restored or deleted and a second known alias list within a second system is updated whenever the first replication link is also related to a second replication link related to the second system and the updating of known alias lists is repeated for each other system which has a replication link that is related to the first replication link;

instructions that cause the data processor to maintain the updated known alias list, within said each system in which the computer-readable storage medium is provided, of all replication links involving said each system and of DNS aliases of other systems associated with said all replication links involving said each system;

wherein the updated known alias list of all replication links involving said each system and of DNS aliases of other systems associated with all replication links involving said each system enables said each system to process network-based requests, on behalf of the other systems associated with all replication links involving said each system, without redirecting the requests from the other systems to said each system.

14. The non-transitory computer-readable storage medium according to claim 13, wherein the instructions that cause the data processor to maintain the updated known alias list comprise:

instructions that cause the data processor to update a known alias list within said each system, the known alias list including mapping of the replication links between the DNS names of the systems associated with all replication links involving said each system, and any replication links that have recently been deleted from said all replication links involving said each system.

15. The non-transitory computer-readable storage medium according to claim 14, wherein for a system to initiate updating the known alias list as an initiating system, the instructions that cause the data processor to update a known alias list within the system comprise:

instructions that cause the data processor to send a synchronization request to all systems that are each connected to the initiating system by a direct replication link, the synchronization request including a local known alias list of the initiating system and the DNS alias of the initiating system;

instructions that cause the data processor to receive a response from each system that received the synchronization request from the initiating system;

instructions that cause the data processor to generate a merged known alias list for the initiating system from all the responses received by the initiating system; and instructions that cause the data processor to store the merged known alias list generated for the initiating system as the local known alias list of the initiating system.

16. The non-transitory computer-readable storage medium according to claim 14, wherein for a system that receives, as a receiving system, a synchronization request from another system with a known alias list of said another system, the instructions that cause the data processor to update a known alias list within the system comprise:

instructions that cause the data processor to merge the known alias list from the synchronization request with a local known alias list of the receiving system to produce a merged known alias list for the receiving system;

instructions that cause the data processor to store the merged known alias list for the receiving system as the local known alias list of the receiving system; and instructions that cause the data processor to return a response to said another system that sent the synchronization request, the response including the merged known alias list for the receiving system.

17. The non-transitory computer-readable storage medium according to claim 16, wherein if the local known alias list of the receiving system has changed based on the synchronization request from said another system, the instructions that cause the data processor to update a known alias list within the system further comprise:

instructions that cause the data processor to propagate the synchronization request to all systems that are each connected to the receiving system by a direct replication link excluding said another system, the synchronization request including the local known alias list of the receiving system and the DNS alias of the receiving system;

instructions that cause the data processor to receive a response from each system that received the propagated synchronization request from the receiving system;

instructions that cause the data processor to generate a new merged known alias list for the receiving system from all the responses received by the receiving system; and instructions that cause the data processor to store the new merged known alias list as the local known alias list of the receiving system.

18. The non-transitory computer-readable storage medium according to claim 17, wherein if the new merged known alias list is different from the local known alias list of the receiving system prior to generating the merged known alias list for the receiving system, the instructions that cause the data processor to update a known alias list within the system further comprise:

instructions that cause the data processor to send a second synchronization request, with the receiving system as a new initiating system, to all systems that are each connected to the new initiating system by a direct replication link, the second synchronization request including the local known alias list of the new initiating system and the DNS alias of the new initiating system;

instructions that cause the data processor to receive a response from each system that received the second synchronization request from the new initiating system;

instructions that cause the data processor to generate a merged known alias list for the new initiating system from all the responses received by the new initiating system; and instructions that cause the data processor to store the merged known alias list for the new initiating system as the local known alias list of the new initiating system.

* * * * *